(12) United States Patent
Jopson et al.

(10) Patent No.: US 6,385,357 B1
(45) Date of Patent: May 7, 2002

(54) METHOD AND APPARATUS FOR COMPENSATING FOR HIGHER ORDER PAID PMD IN A FIBER TRANSMISSION SYSTEM AT THE FIBER OUTPUT

(75) Inventors: Robert M. Jopson; Herwig Kogelnik, both of Rumson; Lynn E. Nelson, Monmouth Beach, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/533,044

(22) Filed: Mar. 22, 2000

Related U.S. Application Data
(60) Provisional application No. 60/150,381, filed on Aug. 23, 1999.

(51) Int. Cl.$^7$ .................................................. G02B 6/00
(52) U.S. Cl. ............................ 385/11; 385/123; 359/161
(58) Field of Search ................................ 385/11, 15, 16, 385/17, 20, 23, 21, 24, 123, 124; 359/161, 140, 156

(56) References Cited

U.S. PATENT DOCUMENTS
5,859,939 A * 1/1999 Fee et al. ...................... 385/24

OTHER PUBLICATIONS
K.O. Hill et al., "Chirped In–Fiber Bragg Gratings for Compensation of Optical–Fiber Dispersion", in Optics Letters, vol. 19, No. 17 (Sep. 1994).
Fabien Roy, "A Simple Dynamic Polarization Mode Dispersion Compensator" No Month No Date.
B.L. Heffner "Automated Measurement of Polarization Mode Dispersion Using Jones Matrix Eigenanalysis", in IEEE Photonics Technology Letters, vol. 4, No. 9 (Sep. 1992).

Robert M. Jopson et al., "Vector Measurement of Polarization Mode Dispersion using the Polarization–Dependent Signal Delay Method" No Date.
Fred Heismann "Analysis of a Reset–Free Polarization Controller for Fast Automatic Polarization Stabilization in Fiber–Optic Transmission Systems" Journal of Lightwave Technology vol. 12 No. 4 (Apr. 1994).
Takashi Ono et al., "Polarization Control Method for Suppressing Polarization Mode Dispersion Influence in Optical Transmission Systems" Journal of Lightwave Technology, vol. 12, No. 5 (May 1994).
Craig D. Poole and Jonathan Nagle, "Polarization Effects in Lightwave Systems" in III A Optical Fiber Telecommunication Chap. 6 (1997).
A.H. Gnauck and Robert M. Jopson, "Dispersion Compensation for Optical Fiber Systems" in III A Optical Fiber Telecommunication Chap. 7 (1997).

(List continued on next page.)

*Primary Examiner*—Phan T. H. Palmer
(74) *Attorney, Agent, or Firm*—Moser, Patterson & Sheridan L.L.P.

(57) ABSTRACT

In an optical fiber transmission system, higher order PMD compensation is realized at the output of the transmission fiber. A compensator is placed at the output of the transmission fiber whose PMD vector is equal in magnitude and opposite in direction to the PMD vector at the output of the transmission fiber. The compensator PMD vector sweeps at a rate that matches the frequency sweep rate of the PMD vector at the fiber output. To compensate for second order PMD while avoiding the introduction of higher order PMD effects, a planar sweep is advantageously employed. A polarization pair controller is employed in advance of the compensator to align the PMD vector at the compensator input with the PMD vector at the fiber output so that the two cancel as well as to align the rotational axis of the compensator PMD vector with the rotational axis of the fiber PMD vector. The system may also include a monitoring device to monitor the compensation of fiber PMD, to determine the need for adjustments to the system.

19 Claims, 13 Drawing Sheets

OTHER PUBLICATIONS

R. Noe, et al. "Integrated optical LiNbO distributed polarisation mode dispersion compensator in 20Gbit/s transmission system", Electronics Letters vol. 35 No. 8 (1999) p. 652–653.

B.W. Hakki, "Polarization Mode Dispersion in a Single-Mode Fiber", J. Lightwave Technology vol. 4, pp. 2202–2208 (1996).

J. Patscher and R. Eckhardt, "Component for Second-Order Compensation of Polarization-Mode Dispersion" Electronics Letters, vol. 33 pp. 1157–1159 (1997).

Fred Hsismann, et al. "Automatic compensation of first-order polarization mode dispersion in a 10Gb/s transmission system," Proceedings of European conference on Optical Communication, vol. 1. p. 529–530 (1998).

* cited by examiner

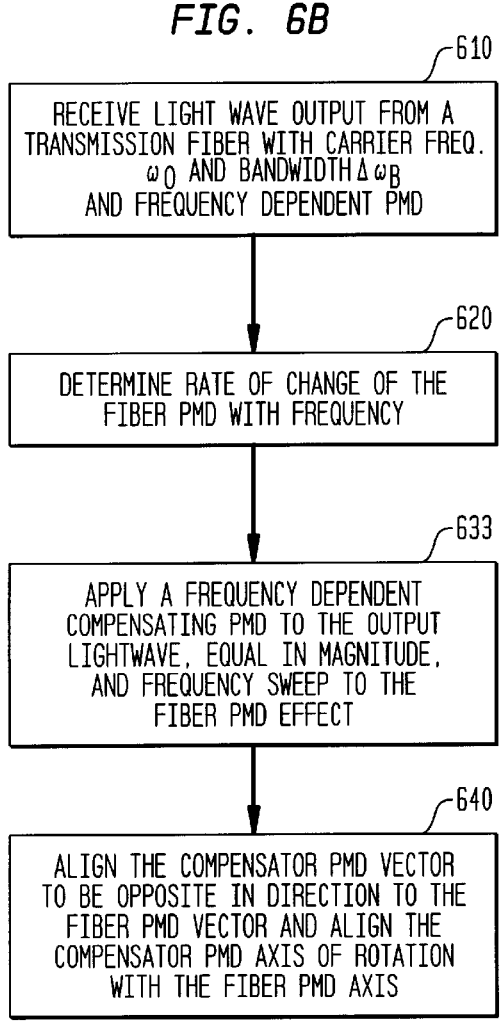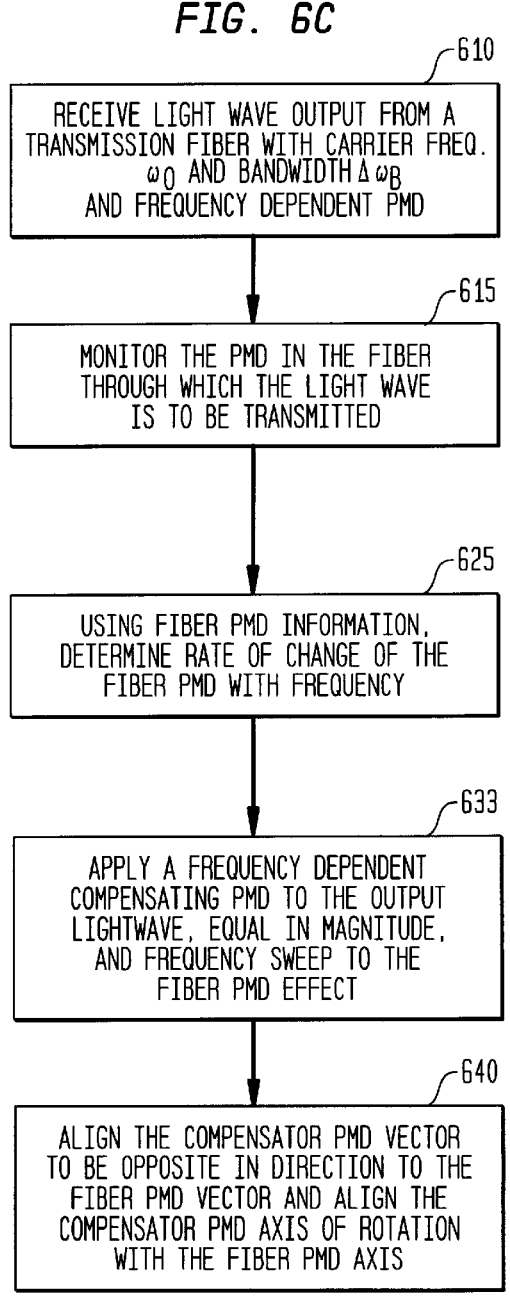

FIG. 12A $$R_1 = \begin{vmatrix} 1 & 0 & 0 \\ 0 & \cos\alpha & -\sin\alpha \\ 0 & -\sin\alpha & \cos\alpha \end{vmatrix}$$

FIG. 12B $$R_{1\omega} = -\Delta\tau_1 \begin{vmatrix} 0 & 0 & 0 \\ 0 & \sin\alpha & -\cos\alpha \\ 0 & \omega\alpha & \sin\alpha \end{vmatrix}$$

FIG. 12C $$\Omega_2 = \begin{vmatrix} \Omega_{21} \\ \Omega_{22} \\ 0 \end{vmatrix}$$

FIG. 12D $$\underline{\Omega}_{c\omega} = -\Delta\tau_1 \cdot \Omega_{22} \begin{vmatrix} 0 \\ \sin\alpha \\ -\cos\alpha \end{vmatrix}$$

FIG. 14A $$\underline{S1} = \begin{bmatrix} \frac{1}{\sqrt{2}} \\ \frac{1}{\sqrt{2}} \\ 0 \end{bmatrix} \quad \underline{S2} = \begin{bmatrix} 0 \\ 0 \\ 1 \end{bmatrix} \quad \underline{S3} = \begin{bmatrix} \frac{1}{\sqrt{2}} \\ \frac{-1}{\sqrt{2}} \\ 0 \end{bmatrix}$$

FIG. 14B $$\underline{T1} = \begin{bmatrix} 1 \\ 0 \\ 0 \end{bmatrix} \quad \underline{T2} = \begin{bmatrix} 0 \\ 1 \\ 0 \end{bmatrix} \quad \underline{T3} = \begin{bmatrix} 0 \\ 0 \\ 1 \end{bmatrix}$$

FIG. 14C $$\underline{R} = \begin{bmatrix} \frac{1}{\sqrt{2}} & 0 & \frac{1}{\sqrt{2}} \\ \frac{1}{\sqrt{2}} & 0 & \frac{-1}{\sqrt{2}} \\ 0 & 1 & 0 \end{bmatrix}$$

METHOD AND APPARATUS FOR COMPENSATING FOR HIGHER ORDER PAID PMD IN A FIBER TRANSMISSION SYSTEM AT THE FIBER OUTPUT

CROSS REFERENCE TO RELATED APPLICATION

This application claims the benefit of U.S. Provisional Application No. 60/150,381, filed on Aug. 23, 1999.

FIELD OF THE INVENTION

The present invention relates to compensating for polarization mode dispersion in a fiber transmission system. More specifically, the present invention relates to compensating for higher order polarization mode dispersion and in one illustrative embodiment the compensation is performed at the output of the fiber transmission system.

BACKGROUND OF THE INVENTION

Optical telecommunications generally involves the use of light modulated with data, transmitted through optical fibers. As the light propagates through the fiber, its signal characteristics may become distorted by the fiber in a number of ways. One type of distortion is known as polarization mode dispersion, or "PMD".

PMD refers to an effect that an optical device, such as a span of optical fiber, has on the separate polarizations of a light beam. A light beam can be approximated as having electrical components that vibrate at right angles to the direction of travel. In the simple case the polarization or state of polarization of the light beam can be thought of as the direction of these right angle vibrations. In the more general case, these components are superimposed in a more complex way. As shown in FIG. 1, within a short optical fiber section 10, an orthogonal set of two polarized waveguide modes 20 and 30 can be found which have electric field vectors aligned with the symmetry axes of the fiber. The polarization of a light beam propagating through the fiber section can be represented by the superposition of vector components aligned with these polarization waveguide modes of the fiber as shown in FIG. 2. In FIG. 2, the polarization waveguide modes 20 and 30 are shown aligned with the two axes. The input polarization 40 is represented as the vector sum of two components 50 and 60 which are aligned with the polarization waveguide modes of the fiber section.

In ideal fiber, which has a perfect circular cross-section and is free from external stresses, the propagation properties of the two polarized waveguide modes are identical. However, imperfections introduced in the manufacturing process may result in fiber that is not perfectly circular. In addition, fiber that has been installed may suffer from external stresses arising from pinching or bending. These manufacturing imperfections and external stresses cause the two polarized waveguide modes to have different propagation characteristics, which in turn gives rise to polarization mode dispersion, or "PMD".

A convenient way to represent the effects of PMD caused by a particular optical device or span of optical fiber uses Stokes space, a three-dimensional geometrical space, and the Poincaré sphere, a sphere within Stokes space where every possible polarization state maps to a specific (and different) point on the sphere. Three axes, S1, S2, and S3, define this three dimensional space and any polarization can be described in reference to these axes, in other words by its S1, S2, and S3 components. The S1, S2, and S3 components of a polarization are called its Stokes components.

PMD affects the field and polarization of a light beam with respect to both time and frequency. With respect to time, PMD causes the two vector components comprising the polarization of the light beam to propagate down the two polarization waveguide modes at different velocities and thus separate in time as seen in FIG. 3. In FIG. 3, the two components 50 and 60 of input polarization 40 are aligned with polarization waveguide modes 20 and 30. This time gap is known as the differential group delay, "DGD" or $\Delta\tau$. The larger the gap, the broader the pulse. This in turn restricts the bit rate that can be transmitted through the fiber. With respect to frequency, the output polarization will vary as a function of the optical carrier frequency in a periodic fashion when the polarization of the light beam at the input remains fixed.

In general, an optical fiber does not have uniform imperfections such that a consistent PMD effect is realized along the entire length of the fiber. However, most fibers can be modeled as a concatenation of many smaller fiber sections, each of which is considered to have a uniform birefringence and thus impart a uniform PMD to the light beam travelling through it. Birefringence refers to the difference in indices of refraction of two components of a fiber that cause a light beam transmitted through the fiber to split into two components. The effect over the full span is analyzed by considering the smaller lengths to be joined such that their respective axes are oriented at random angles relative to each other.

Although the behavior of a real length of fiber is more complex than that of a small section, over a narrow frequency range the PMD effects of both the real length and simple short length fibers are similar. However, instead of two polarization waveguide modes, the real length of fiber can be viewed as having orthogonal pairs of special polarizations, called the principal states of polarization ("PSP") which, in general, vary with frequency. When a pulse is launched into a fiber with some optical power on each PSP, the output will consist of two light pulses separated in time by the differential group delay. As stated above, even for a simple short fiber section, PMD causes the polarization of the light beam at the output of the fiber section to vary with frequency. The frequency effect of PMD can be easily seen when displayed on the Poincaré sphere. As shown in FIG. 4, for a light beam having a fixed input polarization 40, the output polarization 70 of the light beam moves locally in a circle on the surface of the Poincaré sphere as the frequency of the light beam is varied from $\omega_1$, to $\omega_2$ to $\omega_3$.

Using Stokes space and the Poincaré sphere, the various effects of PMD for a given optical device or span of fiber may be compactly represented using a single, three-dimensional vector referred to as the PMD vector or $\underline{\Omega}$. The magnitude of the PMD vector, $|\underline{\Omega}|$, describes the time effect of PMD and the rate of rotation of the output polarization with respect to frequency. In other words, $|\underline{\Omega}|=\Delta\tau$. The direction of the PMD vector is aligned with one of the PSPs for the fiber. This can be represented mathematically as $|\underline{\Omega}|=\Delta\tau q$, where q is the unit vector indicating the direction of one of the PSPs.

Since PMD can limit the transmission bandwidth of optical fiber, measurement of the PMD of a span of fiber is necessary to determine the span's data transmission capability. PMD measurements can provide useful information for compensating the PMD in the span as well. There are many known methods for measuring PMD. Some methods only provide a measurement of the magnitude of PMD, i.e., the differential group delay, and do not provide information on the PMD vector characteristics. One example of a method for measuring PMD is the Poincaré Sphere Technique, or "PST". For each PMD determination, two different input polarizations are injected into an optical device under test at each frequency of a frequency pair and the output polarizations are measured. An example of a device under test is a fiber section. Specifically, a light beam having a first input polarization is injected at the first frequency of the frequency pair into an optical device under test and the output polarization measured. Then, a light beam having this same first input polarization is injected at the second frequency of the frequency pair into the device under test and a second output polarization is measured. Third, a light beam having a second input polarization is injected at the same first frequency of the frequency pair into the device under test and a third output polarization is measured. Finally, a light beam having this same second input polarization is injected at the same second frequency of the frequency pair into the device under test and a fourth output polarization is measured. Depending on the results, a different first polarization may have to be chosen and the process repeated. The PMD for this first frequency pair is then calculated. This same procedure is used to determine the PMD for the other frequency pairs remaining in the frequency range being tested.

FIG. 5 shows a block diagram of a general apparatus capable of carrying out the previously described method. Control block 550, which could be a computer, directs tunable laser source 510 to sequentially emit light beams of various frequencies, such as the first and second frequencies described above. Control block 550 also directs polarizing device 520 to impart one of several polarizations to the beams emitted from 510, such as the first and second polarizations described above. Polarizing device 520 could consist of one or more linear or circular polarizers, with the number and type of polarizers depending upon the requirements of the specific PMD measurement method used. The light beams pass through the device being tested 530, such as a section of fiber, and are captured in polarization measuring device 540, which could be a polarimeter. Polarization measuring device 540 then measures the output polarization states of the light beams and passes this information to analysis block 560. Analysis block 560, which could be a computer, then calculates the PMD according to the algorithm used by the specific method.

Other methods have been proposed to determine the full vector characteristics of PMD for deducing the effects of higher order PMD. Higher order PMD describes the change of the PMD vector with frequency. Knowledge of the higher order PMD effects is necessary where there are significant changes of the PMD vector across the signal frequency bandwidth. Second order PMD specifically, reflects the linear frequency dependence of both the magnitude and direction of $\underline{\Omega}$. In other words, second order PMD manifests in a changing differential group delay and output polarization with changing frequency.

This latter set of methods of determining higher order PMD are described in U.S. patent application Ser. No. 09/395,238, filed on Sep. 13, 1999 and entitled Apparatus And Method For Improving The Accuracy Of Polarization Mode Dispersion Measurements and U.S. patent application Ser. No. 09/390,033, filed on Sep. 3, 1999 and entitled Method For Measurement Of First- And Second Order Polarization Mode Dispersion Vectors In Optical Fibers, both of which are hereby incorporated by reference as if fully set forth herein. Both of these are commonly assigned with the subject invention.

The ability to measure PMD or its effects is one thing, to correct for PMD is another matter. Existing methods for compensating for PMD are known. However, they are all limited in scope. One such known method is described in Takashi Ono et al., "Polarization Control Method for Suppressing Polarization Mode Dispersion Influence in Optical Transmission Systems," in Journal of Lightwave Technology vol. 12, No. 5 pp 891–897 (1994), hereby incorporated by reference as if fully set forth herein. Ono teaches that for a given optical frequency the group time delay effect of PMD can be eliminated by launching the light beam with a polarization that is aligned with one of the two input PSPs of the optical fiber. By launching at the PSP there is effectively one polarization component. Therefore there can be no difference in velocity between the two components and this effect of PMD is avoided.

Ono however, does not eliminate the effects of second and higher order PMD. In a real optical system, a signal has a bandwidth or range of optical frequencies, while the signal is usually launched with a single polarization. Since the PSP of the optical fiber varies with frequency, the polarization of the light beam loses its alignment with the PSP across the signal bandwidth. These effects are not compensated by Ono's method.

Another approach to compensating for higher order PMD effects is described and claimed in a co-pending and commonly assigned U.S. patent application, Case No. 09/468, 968 filed Dec. 22 1999, having the same named inventors as the subject application. This earlier filed case approaches higher order PMD compensation from the head end of a transmission fiber, using some concepts similar to those taught in Ono to properly launch a light wave to avoid the PMD effects at the output of the fiber. That invention differs significantly from Ono, however, by addressing first and higher order PMD effects, whereas Ono only addresses first order PMD.

SUMMARY OF THE INVENTION

In accordance with the present invention first and higher order PMD in an optical fiber is compensated at the output of the fiber by subjecting the output light wave to additional frequency dependent PMD, equal in magnitude and opposite in direction to the output PMD of the fiber. As a result, the PMD effect of the fiber on the compensated output light wave is negated.

In accordance with the method of the present invention, a compensator device, including a multitude of components such as a trombone, phase plate, birefringence fiber, or any other known device for compensating for differential group delay is placed at the output of the fiber. In order to compensate for the frequency effects on the fiber PMD, the light wave output from the fiber is passed through a compensator device. This device creates a sweep of the PMD vector at the compensator input. The compensator's sweep rate must match the sweep rate of the fiber PMD. In the absence of this matching of sweep rates, rather than canceling the fiber PMD, additional higher order PMD effects will be introduced. A special case is the planar sweep condition, which has several advantages. In addition, a polarization pair controller is introduced in advance of the compensator in order to align the principal states of the fiber and the compensator and the rotation axes of their sweeps.

In one embodiment of the present invention a monitoring device may be introduced in the system to monitor the compensation. Accordingly, any necessary adjustments to the compensation can be identified and applied.

BRIEF DESCRIPTION OF THE DRAWINGS

FIG. 6B is a flow chart of a second embodiment of the PMD compensation method of the present invention.

FIG. 6C is a flow chart of a third embodiment of the compensation method of the present invention in which the fiber PMD is monitored.

FIG. 12A represents a rotation matrix of one fiber section of a two polarization maintaining fiber compensator in accordance with the present invention.

FIG. 12B represents the angular frequency derivative of the matrix of FIG. 12A.

FIG. 12C represents the PMD vector of the second PMD section.

FIG. 12D represents one form of an equation for the second order PMD of the compensator of the present invention.

FIG. 14A represents an example for the coordinate system $S_i$ at the compensator input.

FIG. 14B represents an example for the coordinate system $T_i$ at the fiber output.

FIG. 14C represents an example of the required rotation matrix of the polarization pair controller.

DETAILED DESCRIPTION OF THE INVENTION

As stated above, higher order PMD describes the change of the PMD vector both in magnitude and in direction, with changes in frequency. Higher order PMD is described by tile coefficients of a Taylor series in $\Delta\omega$ of the PMD vector $\underline{\Omega}$ evaluated at the carrier frequency $\omega_0$. For ease of presentation we limit our discussion to second order PMD which reflects the linear frequency dependence of both the magnitude and direction of $\underline{\Omega}$. This can be represented mathematically as $\underline{\Omega}(\omega)=\underline{\Omega}(\omega_0)+\underline{\Omega}_\omega(\omega_0)(\omega-\omega_0)$ where $\underline{\Omega}_\omega$ is the second order PMD vector.

The two effects of second order PMD, (i) linear changes in the direction of the PMD vector as a function of frequency and (ii) linear changes in the magnitude of the PMD vector as a function of frequency, can be represented mathematically as $\underline{\Omega}_\omega = \Delta\tau_\omega \underline{q} + \Delta\tau \underline{q}_\omega$. In other words, the PMD vector is a linear function of frequency, and its derivative $\underline{\Omega}_\omega$, represents the change of differential group delay as a function of frequency along a particular PSP and the change of the direction of the PSP with frequency.

PMD can be compensated at the fiber input. When higher-order effects are ignored, PMD is characterized by the first order PMD equation, $\underline{\Omega}_\omega = \Delta\tau \underline{q}$. Compensation schemes for first order PMD are well known. For example, a light beam with a fixed frequency $\omega$ may be launched into a fiber with a polarization that is aligned with the direction of one of the PSPs of the fiber at $\omega$. When second-order PMD is significant but $\underline{q}_\omega=0$, a light beam could be input to the fiber with its polarization aligned with one of the PSP's of the fiber. Then $\Delta\tau_\omega$ could be treated as chromatic dispersion and compensated using well known compensating methods. See A. H. Gnauck & R. M. Jopson, "Dispersion Compensation for Optical Systems," in *Optical Fiber* Telecommunications Vol. IIIA, pp. 162–195 (ed. I. P. Kaminov and T. L. Koch, Academic Press, New York, 1997) hereby incorporated by reference, as if fully set forth herein.

Alternatively, PMD can be compensated at the fiber output. When higher-order effects are ignored, the PMD effect on a light wave exiting a span of transmission fiber can be compensated by applying to the light wave a compensating PMD vector which is equal in magnitude, but opposite in direction to the fiber PMD vector. The compensating PMD vector will cancel the fiber PMD and the compensated system will have little or no PMD. When higher-order effects are present, this cancellation has to be done at every significant frequency. Mathematically this is expressed as $\underline{\Omega}_c(\omega)+\underline{\Omega}_f(\omega)=0$.

Figure 1:
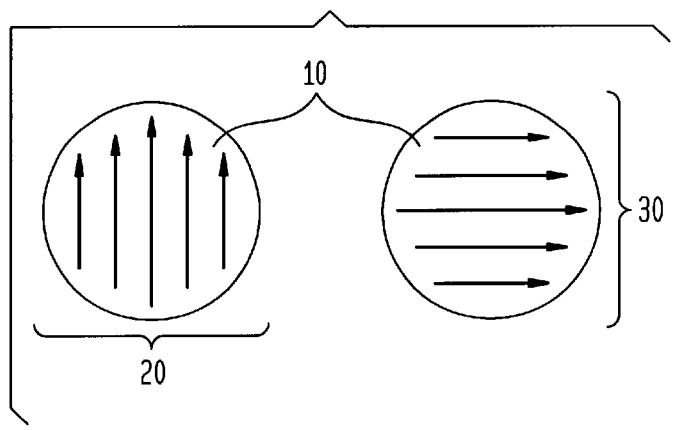
FIG. 1 illustrates the orthogonal set of waveguide modes corresponding to a section of an optical fiber.
Figure 2:
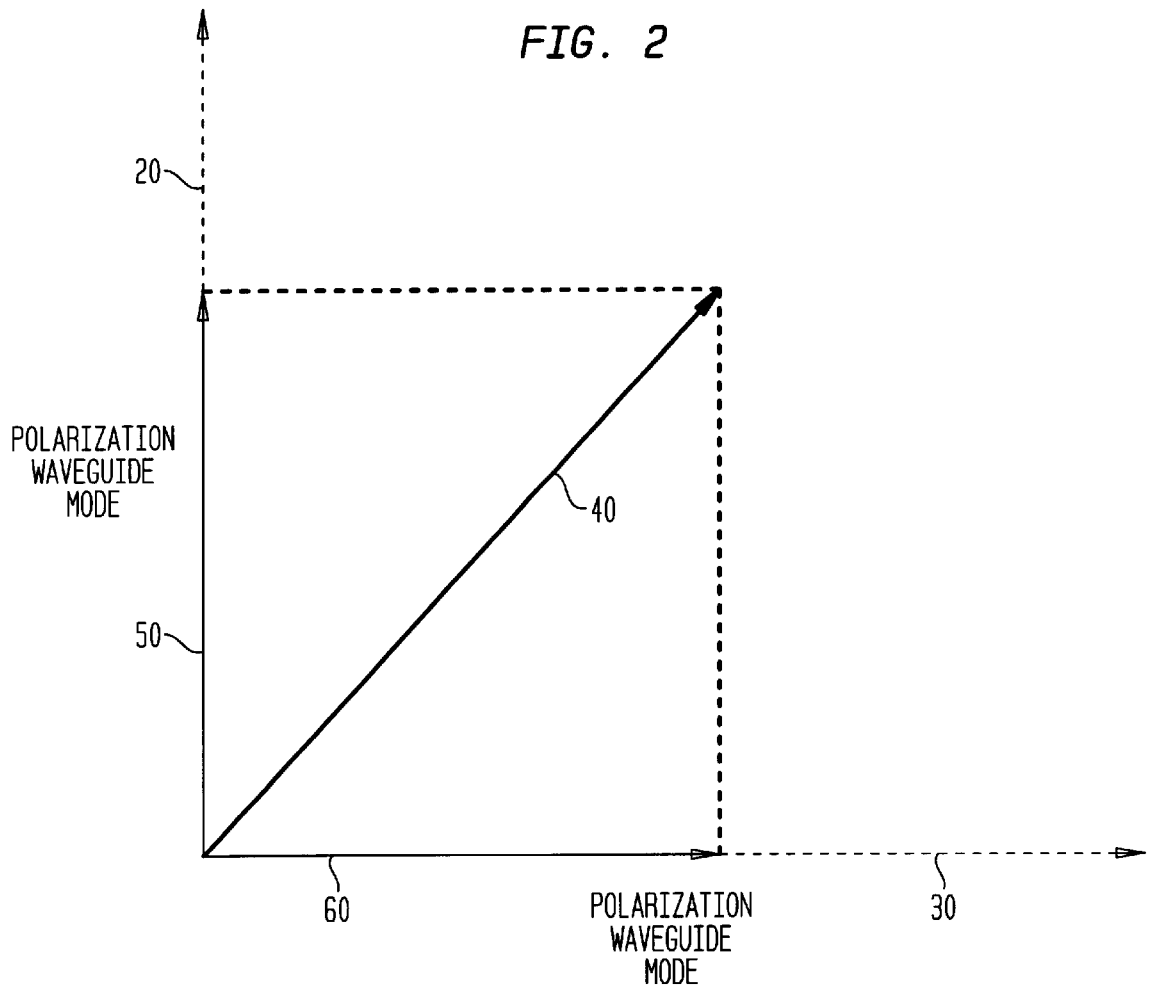
FIG. 2 is a graphical illustration of the representative vector of the polarization of a light beam propagating through a waveguide and its vector components aligned with the orthogonal set of waveguide modes.
Figure 3:
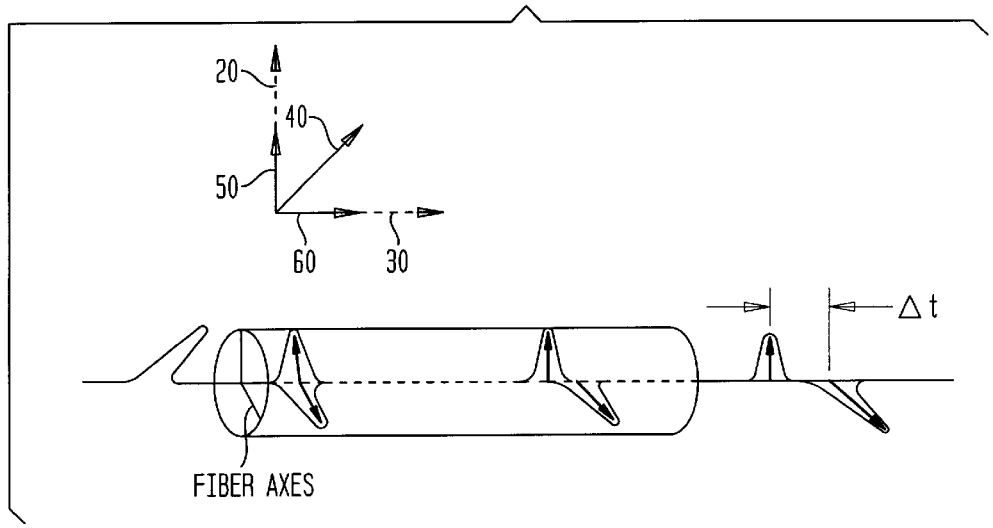
FIG. 3 illustrates the time gap delay between the pulses carried by the two polarization waveguide modes after propagating through a fiber section with PMD.
Figure 4:
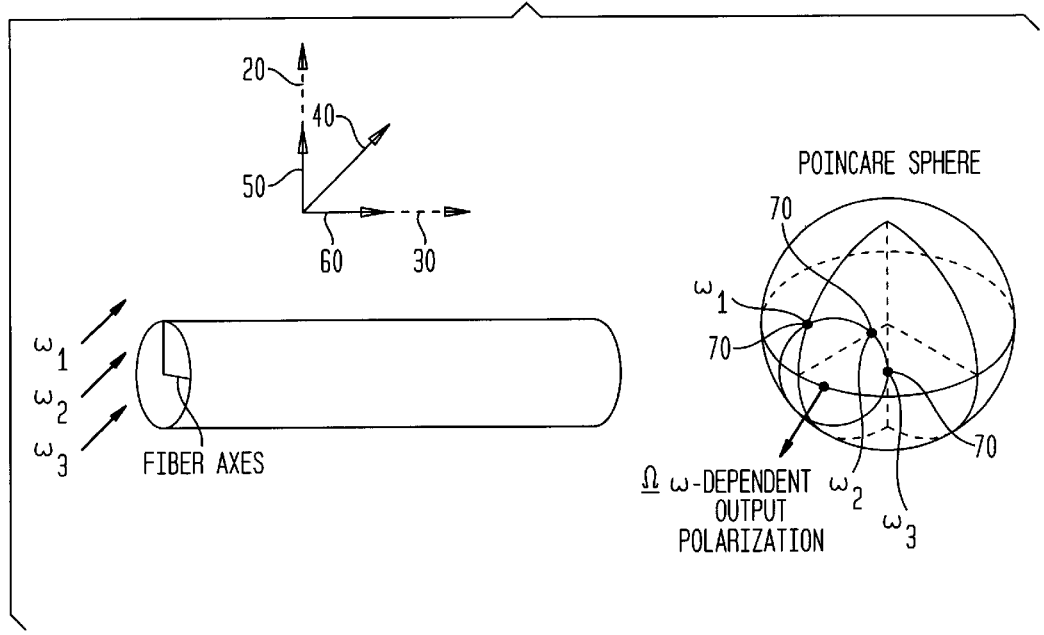
FIG. 4 illustrates the frequency dependence of output polarization of a light beam and how it is represented in a Poincaré Sphere.
Figure 5:
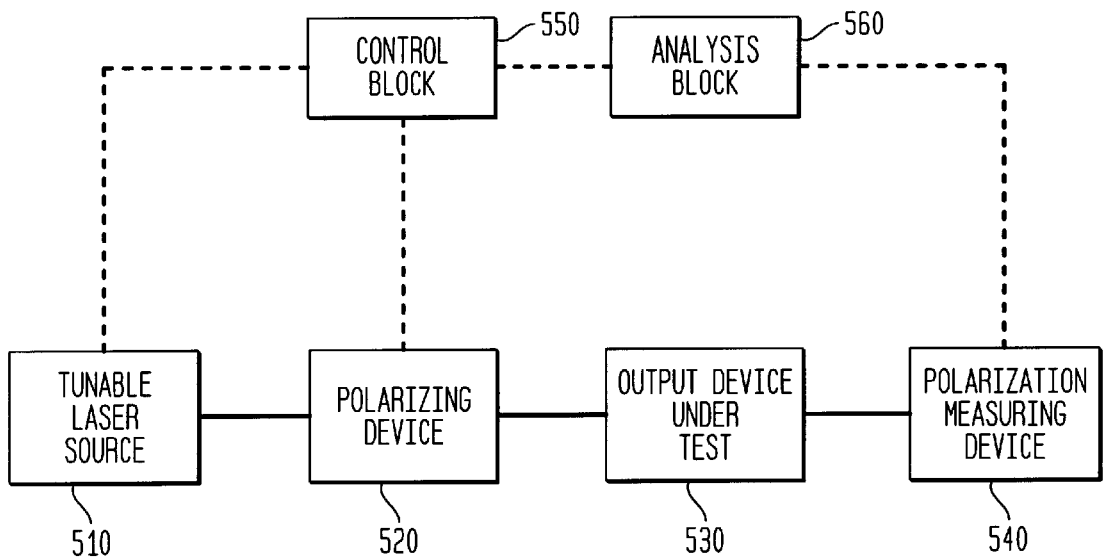
FIG. 5 is a block diagram of an apparatus for measuring PMD in an optical fiber.
Figure 6A:
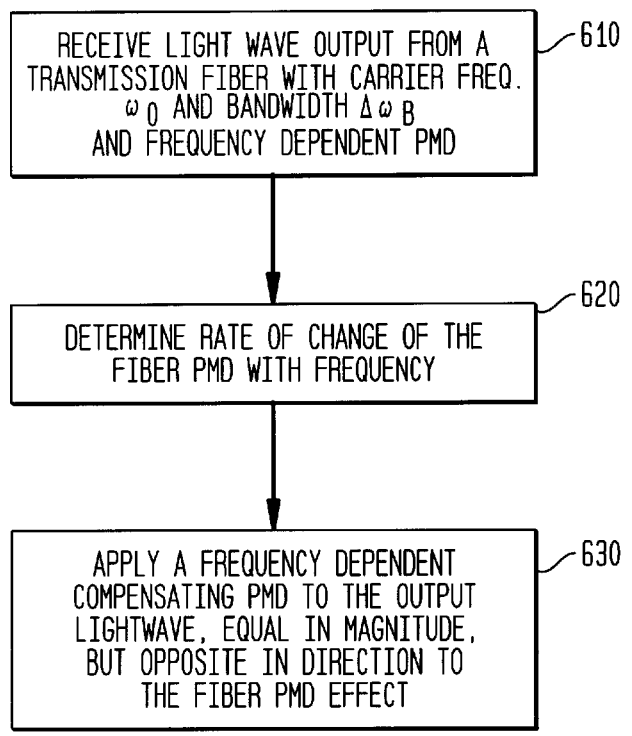
FIG. 6A is a flow chart of one embodiment of the PMD compensation method of the present invention.

When second-order PMD is significant, $\underline{q}_\omega$, the change in direction of the PMD vector as a function of frequency, is not zero and the second component of the second-order PMD vector must also be considered. This second component reflects that the PSP of the fiber is changing across the bandwidth of the signal. Consequently, it is no longer a simple matter to add a single equal but opposite compensating PMD to the light wave at the fiber output. For the case of adding a compensating PMD, the subject of the present invention, it is necessary to adjust the compensator over the frequency bandwidth of the light wave and produce the same rate of change as the fiber PMD. in order to effectively cancel the fiber PMD with the compensating PMD. Furthermore, it is necessary to align the frequency dependent fiber PMD and frequency dependent compensating PMD so that a canceling of PMD results Thus, in accordance with the present invention, higher order PMD, in particular second order PMD, is compensated at the output of a transmission fiber. With reference to FIG. 6A, the first step 610 involves receiving a light wave with carrier frequency $\omega_0$ and bandwidth $\Delta\omega_B$ at the output of the transmission fiber. At the fiber output a compensating PMD is applied to the light wave, as shown in block 630. The compensating PMD is set to be equal in magnitude and opposite in direction to the PMD at the fiber output. With reference to blocks 633 and 640 of FIG. 6B, this is accomplished by applying to the compensating PMD a frequency sweep matching and in alignment with the fiber PMD. The alignment must be of both the PMD vectors of the fiber output and the compensator and their respective axes of rotation. However, to effectively perform the step of block 630, it is necessary to determine the rate of change of the fiber output PMD with frequency in order to match it with the compensating PMD, block 620.

As mentioned above, the method of the present invention depends on knowledge of the fiber output PMD so that the input compensating PMD can be controlled to match and thus effectively cancel the fiber output PMD. This information may be known a priori, as assumed by the flow chart of FIG. 6B. Alternatively, the PMD of the fiber may be directly monitored as suggested by blocks 615 and 625 in FIG. 6C. This can be done in many different ways. Some of these methods are described in U.S. patent application Ser. No. 09/395,238 now U.S. Pat. No. 6,144,450 filed on Sep. 13, 1999 and entitled Apparatus And Method For Improving The Accuracy Of Polarization Mode Dispersion Measurements, and U.S. patent application Ser. No. 09/390,033, filed on Sep. 3, 1999 and entitled Method For Measurement Of First- And Second Order Polarization Mode Dispersion Vectors In Optical Fibers, supra.

Whether the PMD information is known a priori, or is dynamically measured, it is not always necessary to measure the actual PMD values. One may also detect an effect of the fiber PMD, such as bit error rates, with the objective that when the compensator is properly adjusted that effect will be eliminated or reduced, as desired.

Figure 6D:
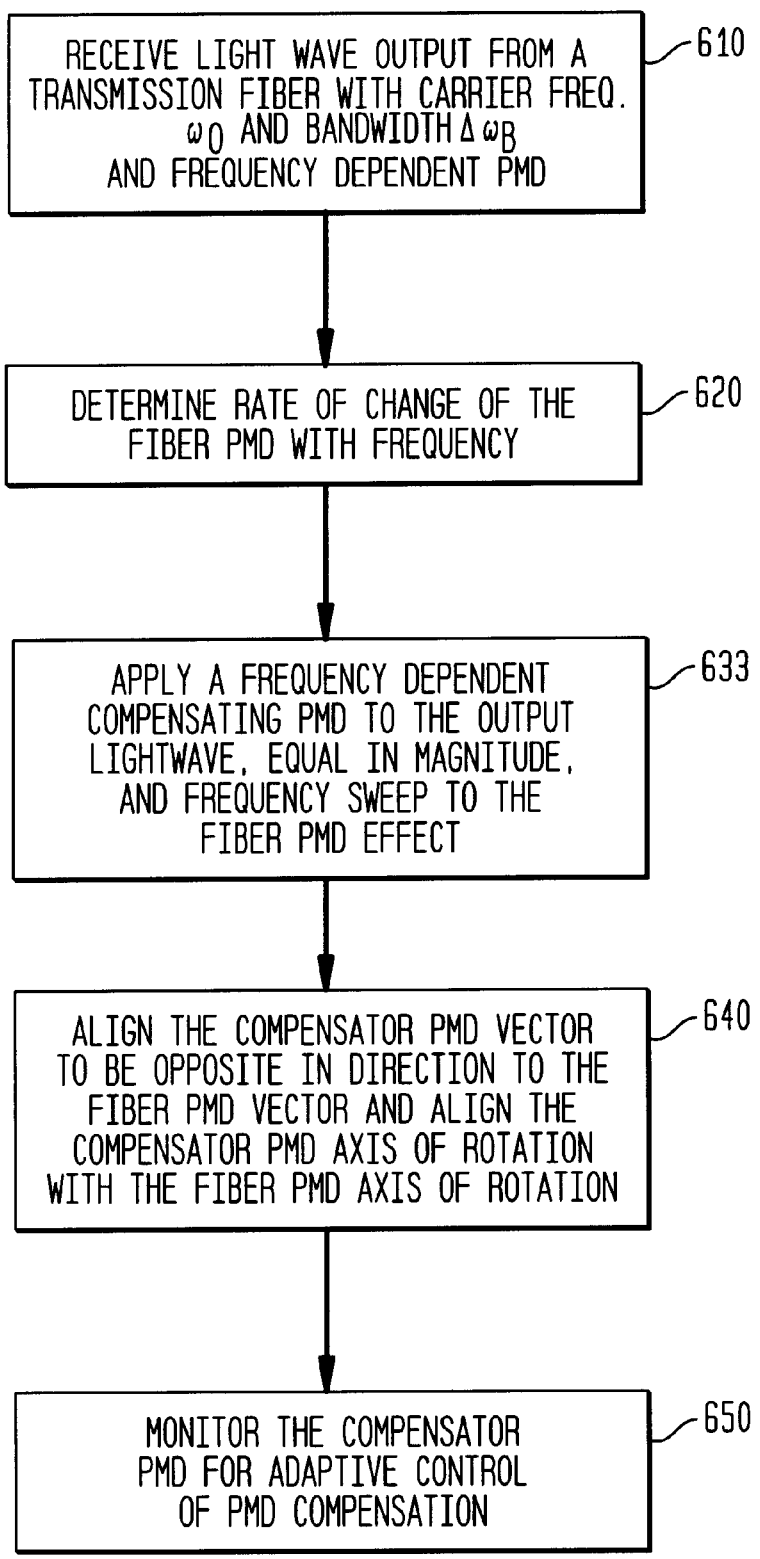
FIG. 6D is a flow chart of a fourth embodiment of the method of the present invention wherein the compensator PMD is monitored for adaptive control of the compensation process.

In a further alternative embodiment of the method of the present invention it is possible to monitor the compensating PMD and/or the compensated PMD which is the PMD of the overall compensated system, as shown in block 650 in FIG. 6D. This allows for oversight of the compensation process to assure that the desired result is achieved. Furthermore, the monitor may be used with an adaptive control means for adjusting the compensating PMD where adjustment is indicated by the data from the monitor.

Figure 7:
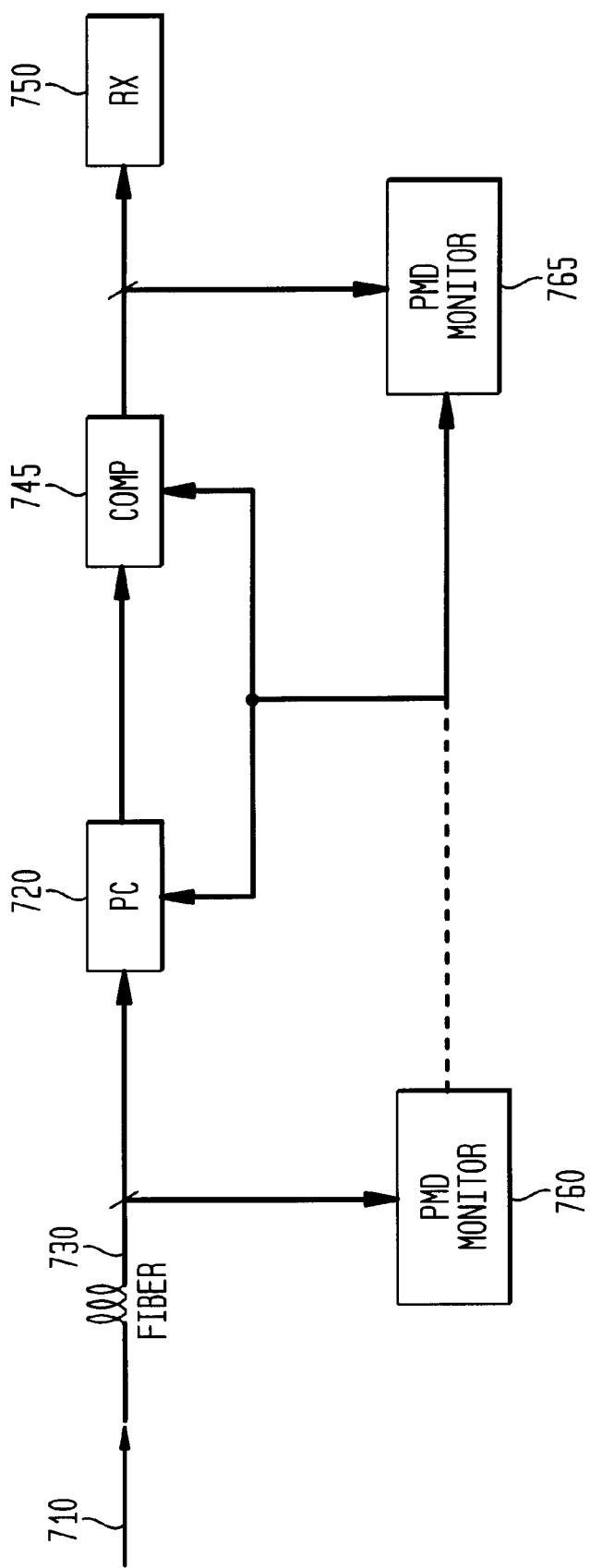
FIG. 7 is a schematic of one embodiment of the system of the present invention for implementing second order PMD compensation at the transmission fiber output.

In accordance with the present invention, a system for implementing higher order PMD compensation as briefly described above, is illustratively shown in FIG. 7. Light wave 710 is transmitted through a transmission fiber 730. At the output of fiber 730, light wave 710 is characterized in part by the PMD effect at the fiber output. At this point and in accordance with the present invention, a compensating PMD is applied to the light wave through compensator 745 together with polarization pair controller ("P²C") 720.

In general, compensator 745 is designed to have an input PMD at the polarization-controller/compensator interface, i.e. $\Omega_c(\omega)$, which varies as a function of frequency, and which cancels the PMD at the fiber output for all frequencies within the transmission band. To compensate for second order PMD, the sweep of the input PMD vector of compensator 745 must match the sweep of the PMD vector at the fiber output.

Figure 9:
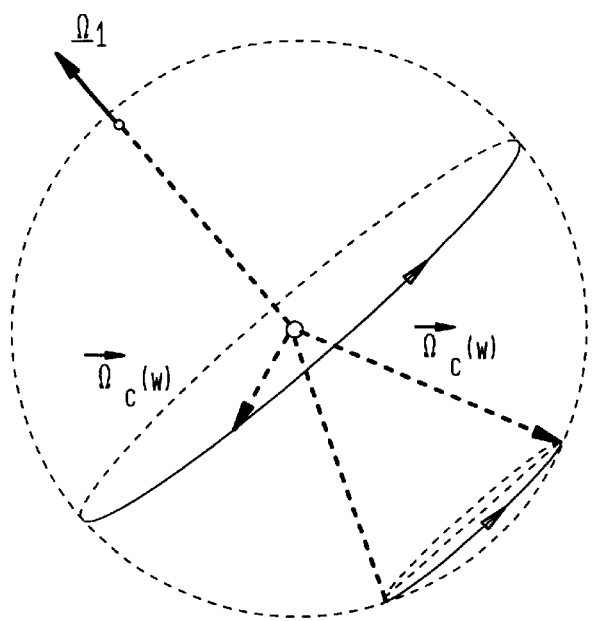
FIG. 9 is a Poincaré sphere illustrating the second order planar sweep of a PMD vector.

The nature of a planar sweep of the PMD vector can be seen using a Poincaré sphere. Since the PMD vector changes in direction with changes in frequency, the point at which the vector intersects the surface of the sphere changes. When all PMD vectors produced by the sweep stay in the same plane, the sweep is planar. As shown in FIG. 9, where the Poincaré sphere is drawn with a radius equal to the magnitude of the PMD vector, the sweep traces a plane rather than a cone, from the sphere surface to the center of the sphere.

Polarization pair controller 720 is used at the input to compensator 745 to align the polarization of the output light wave 710 so that the compensating PMD vector and its axis of rotation are aligned with the fiber PMD vector mid its axis of rotation, respectively.

As stated above, in order to apply a compensating PMD that matches the fiber output PMD, it is necessary to determine the fiber output PMD. This can be accomplished with PMD monitor 760, which taps into fiber 730 at the fiber output. The information may be made readable through any known means including video display and print. A communication system, including a computer network, may be used to link the PMD monitor 760 with a controller (not shown) for the compensator device 745. In one embodiment of the present invention the PND monitor 760 may be software run on a general-purpose, or special-purpose computer. Indeed the controller (not shown) may be a separate software program run on the same computer processing the PMD monitor 760 program.

Furthermore, PMD monitor 765 may be inserted between compensator 745 and receiver 750 to determine if the compensated PMD vector actually equals zero. The conpensated PMD vector is the sum of the fiber output PMD and the compensator PMD vector as it appears at the output of compensator 745. A feedback loop from PMD monitor 765 to polarization controller 720 and compensator 745 allows for adjustment of these two components where necessary. It is possible to network the functions of monitor 765, compensator 745 and polarization controller 720. In this embodiment, the network forms the feedback loop. Similarly, PMD monitors 760 and 765, compensator 745 and/or polarization controller 720 may all be inter-linked, including by means of a computer network.

Various physical implementations of a compensator in accordance with the present invention are possible, some of which are described below. It is a matter of design whether one compensator is designed to work for all frequency ranges, or each compensator is designed for the frequency range of the light wave expected to pass through it. When designing this system it is important to select elements of a compensator, whose properties give rise to an input PMD as described above, such that when combined with the fiber output PMD in accordance with well known concatenation rules, the output of the compensated system will be free of first and second order PMD effects.

Figure 8A:
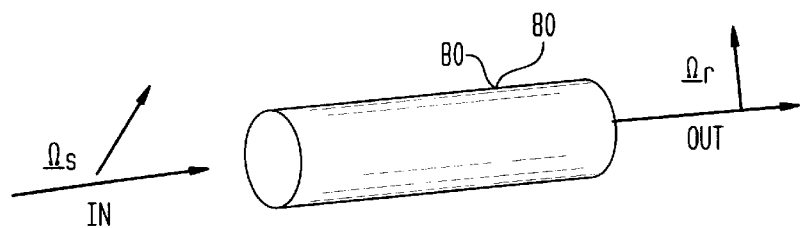
FIG. 8A depicts a transmission fiber with input and output PMD vectors.

In one embodiment of the present invention the compensator 745 comprises two adjustable sections of polarization maintaining fibers. Adjustable refers to the ability to change the PMD magnitudes $|\Omega_1|$ and $|\Omega_2|$ of both sections, as well as the angle between the PMD vectors of the two sections. To understand the design of this embodiment of compensator 745 we first refer to FIG. 8A, in which a single fiber section 80 is shown with PMD vectors $\underline{\Omega}_s$ and $\underline{\Omega}_t$ at the input and output of fiber 80, respectively. These PMD vectors are related by the equation $\underline{\Omega}_{t\omega}=R\,\underline{\Omega}_{s\omega}$, where R is the rotation matrix of the fiber section.

Figure 13A:
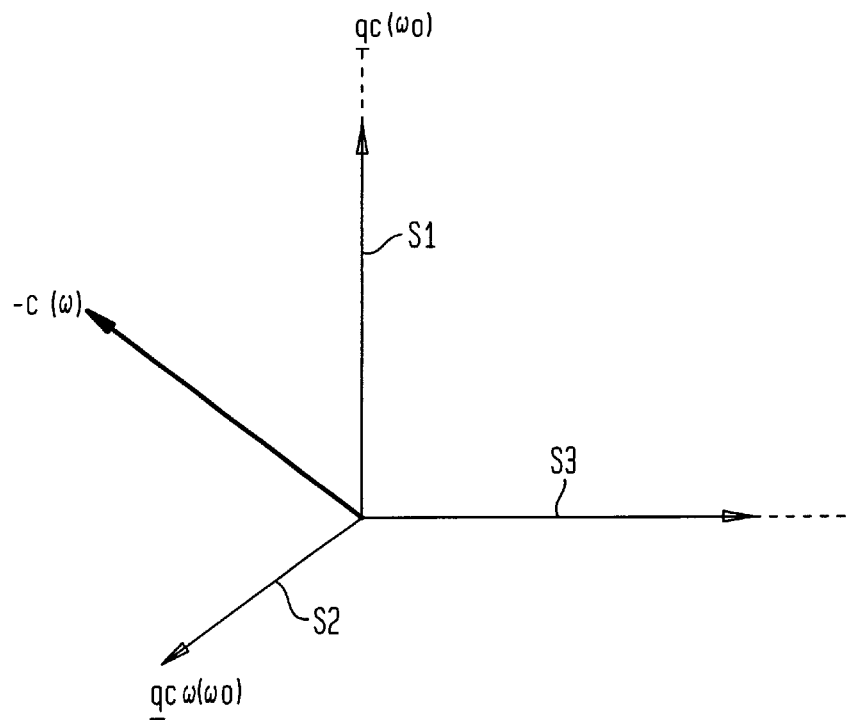
FIG. 13A represents the frequency-dependent input PMD vector of the compensator.
Figure 13B:
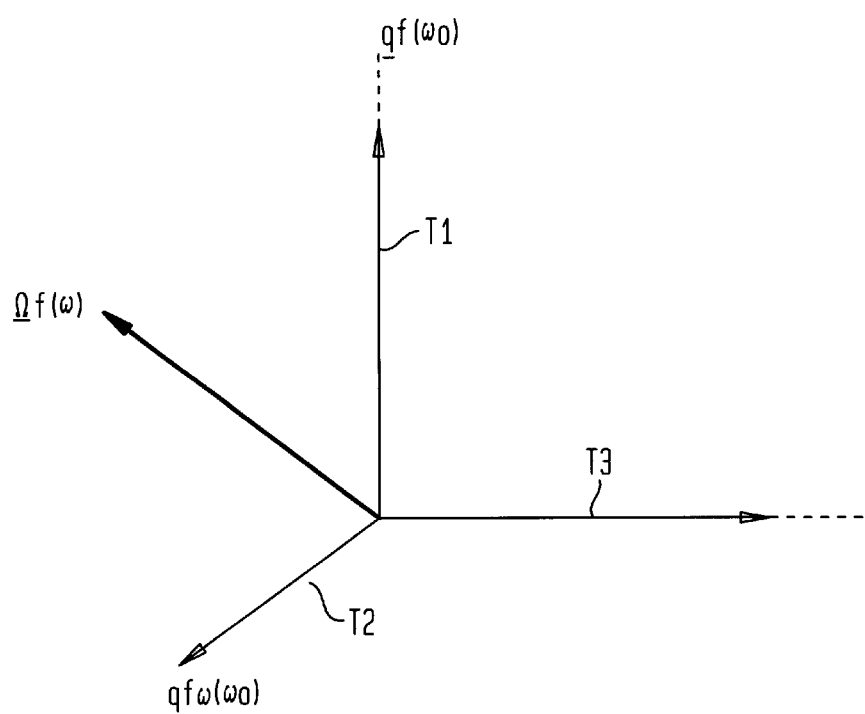
FIG. 13B represents the frequency-dependent output PMD vector of the fiber.

Referring to FIGS. 13A and 13B the compensator PMD and fiber PMD vectors are plotted in Stokes space. As shown, the sweep of the compensator PMD $\underline{\Omega}_c$ is in the plane defined by $\underline{q}_c(\omega_0)$ and $\underline{q}_{c\omega}(\omega_0)$, in the coordinate system $\underline{S}_1=\underline{q}_c$, $\underline{S}_2=\underline{q}_{c\omega}$, and $\underline{S}_3=\underline{S}_1\times\underline{S}_2$. Similarly, the sweep of the fiber PMD $\underline{\Omega}_f$ is in the plane defined by $\underline{q}_f(\omega_0)$ and $\underline{q}_{f\omega}(\omega_0)$, in the coordinate system $\underline{T}_1=\underline{q}_f$, $\underline{T}_2=\underline{q}_{\omega f}$, and $\underline{T}_3=\underline{T}_1\times\underline{T}_2$. The object of polarization pair controller 720 is to map the two PMD vectors and sweep planes, one into the other. This is accomplished by producing a wavelength independent rotation that relates input $\underline{T}$ to output $\underline{S}$. This independent rotation may be described using a Miller Matrix R, such that $\underline{T}=R\cdot\underline{S}$. In this matter the two vectors are aligned for every frequency and the fiber axis of rotation $\underline{T}_3$ is aligned with the compensator axis of rotation $\underline{S}_3$. This then satisfies the two objectives of the polarization pair controller as explained above.

Note that conventional polarization control maps one given input polarization vector, e.g. $\underline{S}_1$, into one required polarization vector at the output of the controller, e.g. $\underline{T}_1$. An example of where such polarization control is employed is the first-order compensator system by Fred Heismann et al., "Automatic Compensation of First-Order Polarization Mode Dispersion in a 10 Gb/s Transmission System," Proceedings of European Conference on Optical Communication vol. 1 pp.529–30 (1998), hereby incorporated by reference as if fully set forth herein. In the present case we require the mapping of a pair of given input polarizations, e.g. $\underline{S}_1$ and $\underline{S}_2$, into a pair of required output polarizations, e.g. $\underline{T}_1$ and $\underline{T}_2$. This mapping of pairs of polarization is accomplished by the polarization pair controller described as part of the present invention.

An algorithm used to determine the required matrix elements of R is a generalization of the algorithm used in the Müller Matrix Method. The matrix R is determined in two steps $R_S$ and $R_T$ such that $R=R_S\,R_T$. The matrix elements of $R_T$ are determined from the input vector components $R_{Tij}=T_{ij}$ and the elements of $R_S$ are determined from the required output vector components $R^T_{Sij}=S_{ij}$, where the first index i, of S and T, corresponds to three reference vectors, i=1, 2, 3, and the second index j, refers to their vector components j=1, 2, 3. Once the desired elements of R are known, known algorithms can be used to set polarization pair controller 720. One such algorithm is described in Fred Heismann, "Analysis of a Reset-Free Polarization Controller for Fast Automatic Polarization Stabilization in Fiber-optic Transmission Systems," in Journal of Light wave Technology, vol. 12 No. 4 pp 690–699 (1994), hereby incorporated by reference as if fully set forth herein.

One example of determining the elements of the rotation matrix R is shown in FIGS. 14A–C. Referring to FIGS. 14A and 14B, examples for the vector components $\underline{T}_i$ and $\underline{S}_i$ are shown. From the discussion above, these vectors lead to $R^T_{ij}=S_{ij}$ and $R_{Tij}=T_{ij}$, respectively. R can then be derived from these last two matrices, as explained above. FIG. 14C shows the resulting R found from the specific values chosen in FIGS. 14A and 14B. A method of implementing polarization pair control with the desired R matrix is provided in Heisman, supra.

Figure 8B:
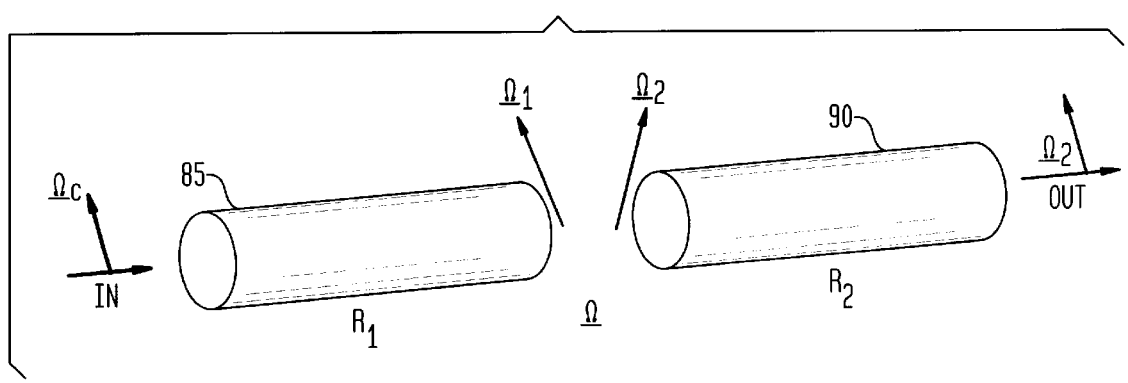
FIG. 8B illustrates one embodiment of the compensator of the present invention comprising two polarization maintaining fiber sections.

Referring to FIG. 8B, two concatenated polarization maintaining ("PM") fiber sections 85 and 90 are depicted with respective matrices, $R_1$ and $R_2$. The respective input and output PMD vectors of the two PM fibers are $\underline{\Omega}_1$ and $\underline{\Omega}_2$. Where these two fibers represent compensator 745, the first order PMD vector $\underline{\Omega}_c$ at the open lateral end of fiber 85 is $R_1^T\underline{\Omega}$, where $\underline{\Omega}$ is the PMD vector at the junction of fiber section 85 and 90 and $R_1^T$ is the transpose of $R_1$. It can be shown that this equates with $\underline{\Omega}_1+R^T\underline{\Omega}_2$. The concatenated second order PMD vector $\underline{\Omega}_{c\omega}$, can be shown to be equal to $\underline{\Omega}_{1\omega}+R_1^T\underline{\Omega}_{2\omega}-\underline{\Omega}_1\times\underline{\Omega}_c$, or $-\underline{\Omega}_1\times R_1^T\underline{\Omega}_2=R_{1\omega}^T\underline{\Omega}_2$.

It should be noted that the sweep of the compensator PMD vector revolves around an axis collinear with the direction of $\underline{\Omega}_1$. This also means that the tip of the compensator PMD vector $\Omega_c$ moves with frequency in a plane that is perpendicular to the PMD vector of fiber section 85, $\underline{\Omega}_1$. This is also evident from the cross product expression at the end of the previous paragraph. In general, the desired compensation requires that $\Omega_c(\omega_0)=\Omega_f(\omega_0)$ and $\Omega_{c\omega}(\omega_0)=\Omega_{f\omega}(\omega_0)$.

As evident by the equations presented above, to compute the first and second order PMD vectors for the compensator, it is important to determine the rotation matrices of the two fiber sections, as well as the PMD vector at the junction of the two fibers. Turning first to the rotation matrices $R_1$, assuming that the first PM fiber section has its slow axis oriented along the x-direction of the fiber, $R_1$ is as given in FIG. 12A. Here $\alpha=\omega\Delta nL/c$, where $\Delta n$ is the differential refractive index, L is the fiber length, and c is the light velocity, and a is equal to $\omega\Delta\tau$. Returning to the equation for the second order compensator PMD, $\underline{\Omega}_{c\omega}=-\underline{\Omega}_1\times R_1^T\underline{\Omega}_2$, it can be shown that $\underline{\Omega}_1 x$ is equal to $R_{1\omega}^T\underline{R}_1$, where $R_{1\omega}$, as shown in FIG. 12B is the angular frequency derivative of $R_1$. The second order PMD equation can now be re-written as $\Omega_{c\omega}=R_{1\omega}^T\underline{R}_1 R_1^T\underline{\Omega}_2$. Recognizing that $\underline{R}_1^T R_1$ equals a unity matrix, $\underline{\Omega}_{c\omega}$ becomes $R_{1\omega}^T\underline{\Omega}_2$. Using the matrix from FIG. 12B and the matrix representing $\underline{\Omega}_2$ as shown in FIG. 12C, $\underline{\Omega}_{c\omega}$ can be rewritten as shown in FIG. 12D.

Figure 10:
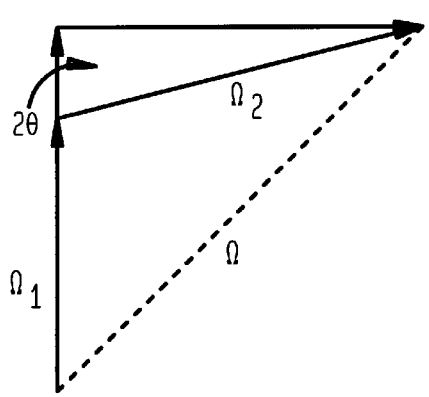
FIG. 10 is a graphical display of the angular relationship of the PMD vectors of two adjacent fiber sections at their junction.

We now turn to computing $\underline{\Omega}$ at the junction of sections 85 and 90. Referring to FIG. 10, vectors $\underline{\Omega}_1$ and $\underline{\Omega}_2$ at their junction, are plotted. As shown, vectors $\underline{\Omega}_1$ and $\underline{\Omega}_2$ are offset one from the other by an angle of $2\theta$. Accordingly, the magnitude of $\underline{\Omega}$ can be derived from the square root of $\underline{\Omega}_1^2+\underline{\Omega}_2^2+2|\underline{\Omega}_1||\underline{\Omega}_2|\cos 2\theta$. Clearly the magnitude of $\underline{\Omega}$ and thus the magnitude $\underline{\Omega}_{c\omega}$ is adjustable by adjusting the angle between the two fiber sections 85 and 90 of the compensator.

The foregoing demonstrates how a two PM fiber compensator can be adjustable in magnitude so that a compensator vector can be created that is equal in magnitude but opposite in direction to the PMD at the transmission fiber output. However, as stated above, due to second order effects, the direction of the fiber PMD is changing at a specific angular velocity with respect to frequency. Thus it is also necessary to design the compensator such that $d\phi/d\omega$, the sweep of the PMD compensator with frequency matches that of die angular velocity of the fiber output PMD.

Figure 11:
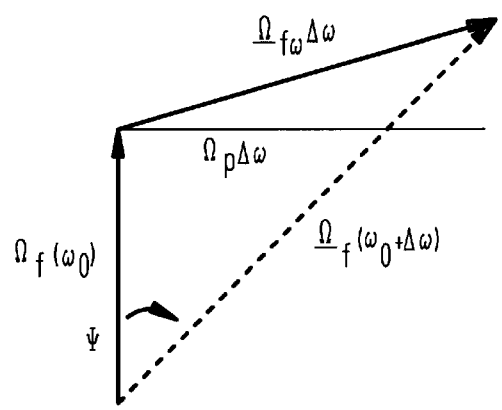
FIG. 11 is a graphical display of the fiber output PMD and its first and second order components.

Thus turning to the fiber output at the junction where the fiber interfaces with fiber section 85 of the compensator shown in FIG. 8B, die fiber output PMD vector $\underline{\Omega}_f$ is shown in FIG. 11 as comprising components $\underline{\Omega}_f(\omega_0)$ and $\underline{\Omega}_{f\omega}\Delta\omega$. These components represent the first and second order PMD vectors, respectively. Also shown in FIG. 11 is the perpendicular component $\Omega_p$ of $\Omega_{f\omega}$. It follows that the change in the angle $\phi$ due to the second order PMD, can be represented by the equation $\Delta\phi=|\underline{\Omega}_p\Delta\omega|/|\underline{\Omega}_f(\omega_0)|$. Thus the angular velocity of the output fiber PMD vector, $d\phi/d\omega=|\underline{\Omega}_p|/|\underline{\Omega}_f(\omega_0)|=|q_{f\omega}|$.

To consider this further we refer back to FIG. 9, showing both a planar and conical sweep by $\underline{\Omega}_c(\omega)$ on the Poincaré sphere. The magnitude of $|\underline{\Omega}_c|$, as explained above is the square root of $\underline{\Omega}_1^2 + \underline{\Omega}_2^2 + 2|\underline{\Omega}_1||\underline{\Omega}_2|\cos 2\theta$. The circular motion sweep of $\underline{\Omega}_c(\omega)$ lies in a plane which is perpendicular to $\underline{\Omega}_1$. In general the circle that is swept forms the base of a cone describing the motion of $\underline{\Omega}_c(\omega)$. The cone angle depends on the parameters of the compensator elements, i.e. the birefringent sections. These parameters include $\underline{\Omega}_1$, $\underline{\Omega}_2$ and $\theta$.

For the special case of a planar sweep, all vectors of $\underline{\Omega}_c(\omega)$ lie in the same plane. For this special case, third and higher order PMD is minimized. It can be shown that a planar sweep is achieved where $|\underline{\Omega}_2| > |\underline{\Omega}_1|$ and $|\underline{\Omega}_1|/|\underline{\Omega}_2| = -\cos 2\eta$.

Figure 15:
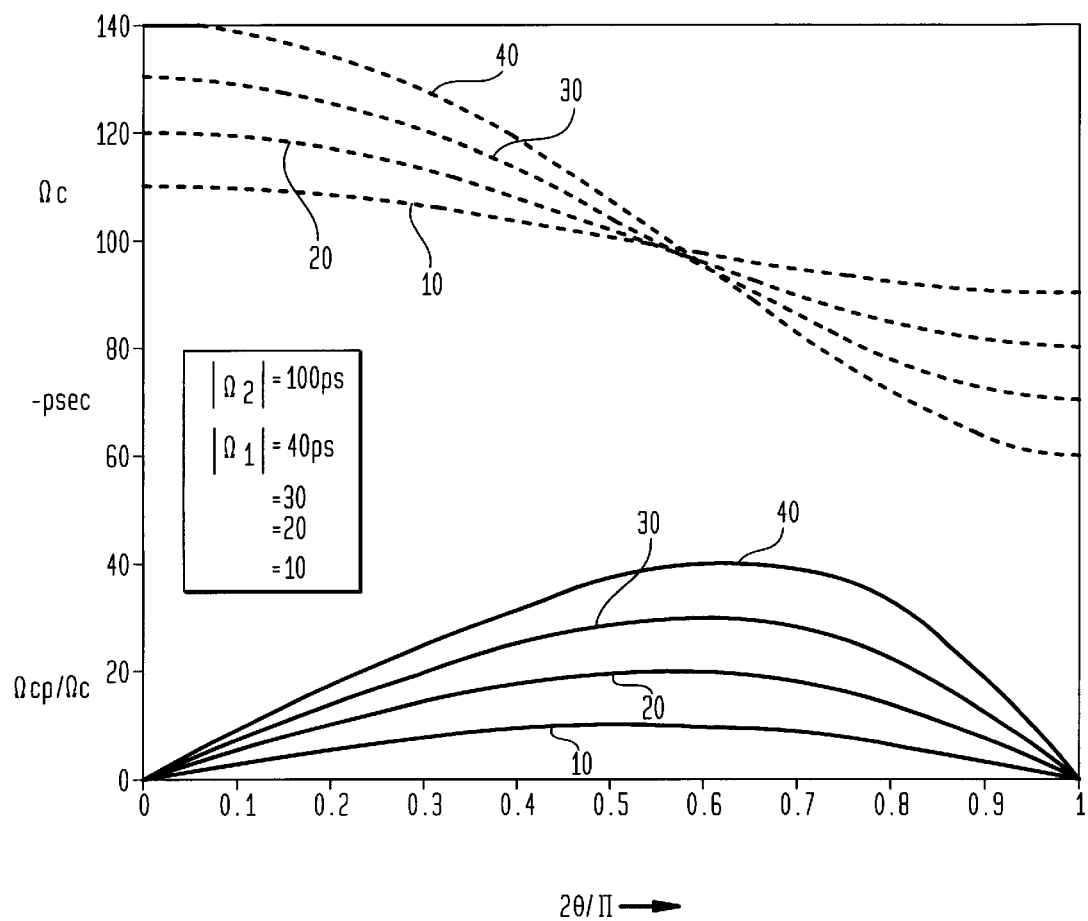
FIG. 15 graphically displays the dependence of the compensator PMD vector and its angular velocity on the PMD vectors of two birefringent compensator elements and the angle formed by the axes of the two birefringent compensator elements.

Referring to FIG. 15, values are obtained for $\underline{\Omega}_c$ in picoseconds (shown at the upper end of the graph) and $|\underline{\Omega}_{cp}|/|\underline{\Omega}_c|$ in picoseconds (shown at the lower end of the graph), for fixed values of $\underline{\Omega}_1$ and $\underline{\Omega}_2$ $_{where}$ $2\theta$ ranges between 0 and $\pi$. For $|\underline{\Omega}_2| > |\underline{\Omega}_1|$, the maximum value for $|\underline{\Omega}_{cp}|/|\underline{\Omega}_c|$ is obtained when $2\theta$ is adjusted for a planar sweep. In this instance, $|q_{c\omega}| = |\underline{\Omega}_1|$. The planar sweep procedure thus has two advantages. First, the compensator value $|q_{c\omega}|$ is relatively insensitive to errors in the adjustment of the angle $2\theta$ as the tangent at that point is horizontal as seen in the lower curve of FIG. 15. Second, the planar sweep achieves the maximum values for the required $|q_{c\omega}|$ of the compensator for a given range of PMD values for the sections of the compensator. In addition, the compensator will add a minimum of third and higher order PMD for the planar sweep adjustment.

While FIG. 15 shows the characteristics of the compensator element for given fixed values of $|\underline{\Omega}_1|$ and $|\underline{\Omega}_2|$, in a preferred embodiment of the present invention an algorithm is used at the design of the compensator to control the correct adjustment of these PMD values. This means that a monitor will determine the values $|\underline{\Omega}_c|$ and $|q_{c\omega}|$ and adjustments will be made to $|\underline{\Omega}_1|$ and $|\underline{\Omega}_2|$ to produce these values. For the general conical sweep, a key algorithm is the compensator equation $|\underline{\Omega}_1|^2 = |\underline{\Omega}_c|^2 + |\underline{\Omega}_2|^2 +/- (|\underline{\Omega}_2|^2 - |q_\omega|^2)^{1/2}$.

Figure 16:
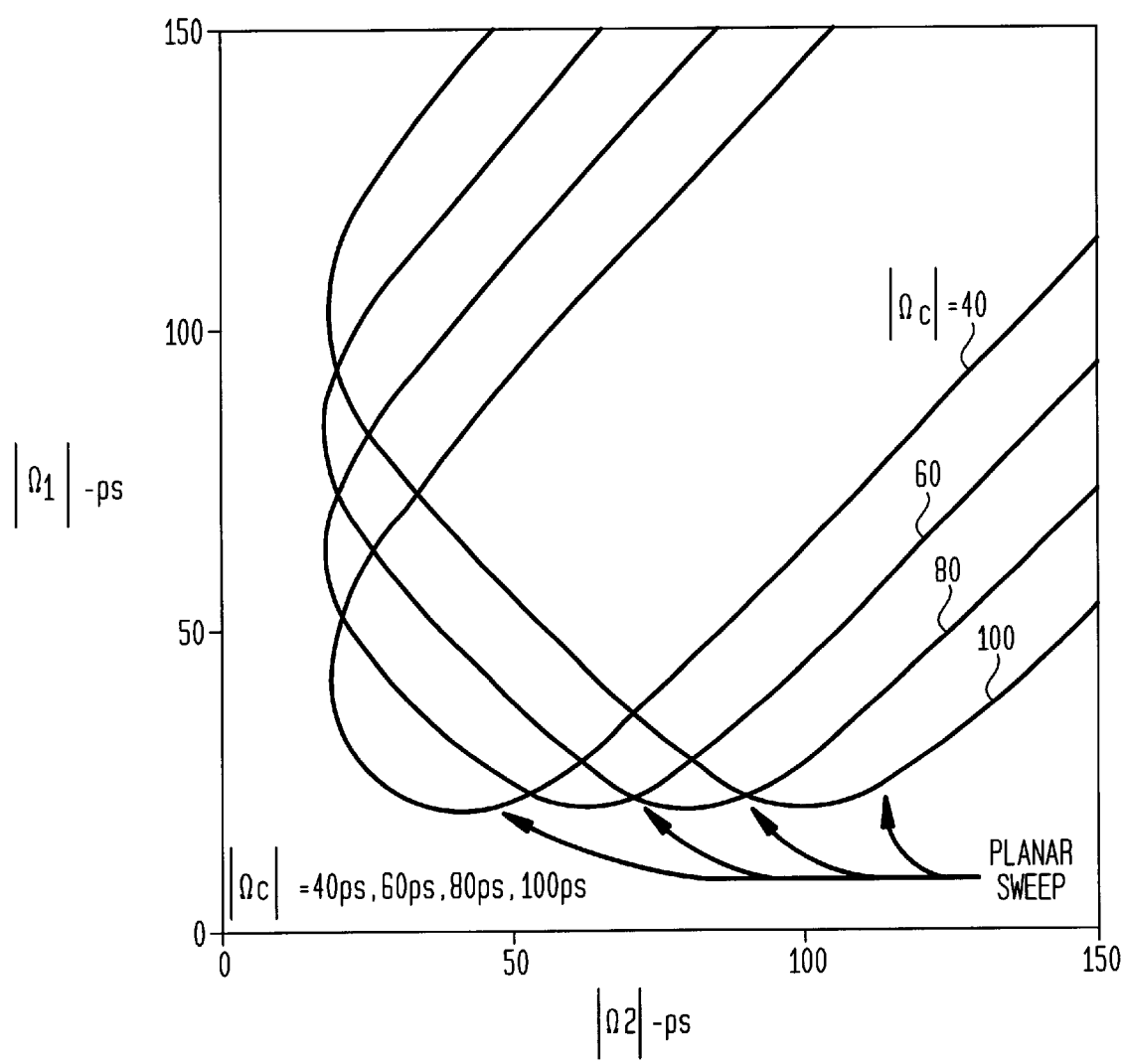
FIG. 16 graphically displays the values of the PMD of the two birefringent compensator elements required to obtain tile given values of the compensating PMD vector and its angular velocity.

Thus by adjusting the three parameters $|\underline{\Omega}_1|$, $|\underline{\Omega}_2|$ and $2\theta$, the desired $|\underline{\Omega}_c|$ and $|q_\omega|$ can be obtained. One of the three variables can be fixed, for example setting $|\underline{\Omega}_1|$ to have a value larger than $|q_\omega|$. This simplifies the compensator to one adjustable element and one fixed element. In FIG. 16 curves for various values of $|\underline{\Omega}_c|$ are shown where $|q_\omega|$ is fixed at 20 picoseconds. As shown the above algorithm yields a value for the required $|\underline{\Omega}_1|$ given an adjustment of $|\underline{\Omega}_2|$, with the required angle $2\theta$ following from known relations.

Accordingly, for the special case of a planar sweep, to match the sweep rate of the fiber output PMD the compensator must be designed such that the PMD of section 85, $|\underline{\Omega}_1|$, equals $|\underline{\Omega}_{cp}|/|\underline{\Omega}_f(\omega_0)| = |q_{f\omega}|$; $|\underline{\Omega}_2|^2 = |\underline{\Omega}_f|^2 + |q_{f\omega}|^2$; and $|\underline{\Omega}_1|/|\underline{\Omega}_2| = -\cos 2\theta$. The values for the output fiber PMD components are either now a priori, or are measured with monitor 760.

In accordance with the present invention, it is not sufficient to merely provide a compensator with a PMD vector equal in magnitude and sweep rate to that of the PMD vector at the fiber output. It is also necessary to (i) align the fiber output PMD vector and the compensator PMD vector at the carrier frequency so that they cancel; and (ii) align the rotational axis of the fiber PMD with the rotational axis of the compensator PMD. These objectives are accomplished by polarization pair controller 720.

As described above one embodiment of the compensator of the present invention comprises two polarization maintaining fibers. A second physical implementation of compensator 745 uses integrated-optics wave guide technology, such as electro-optic crystal $LiNbO_3$, as described in R. Noé, et al., "Integrated optical $LiNbO_3$ distributed polarization mode dispersion compensator in 20 Gbit/s transmission system," Electronics Letters, Vol. 35, No. 8, pp. 652–653 (1999). Other devices for implementing compensator 745 include birefringent fiber combinations and trombones. Birefringent fibers are manufactured to have two well-oriented axes with different propagation speeds. A "trombone" consists of two polarization beam splitters with a variable delay between them. These devices have adjustable PMD's so that $\underline{\Omega}_1$ and $\underline{\Omega}_2$ can be adjusted to obey the conditions stated above. All of these devices allow for adjustment of the required differential group delay, magnitude of the PMD vectors, and sweep rate, $|q_{c\omega}(\omega_0)|$.

Alternative embodiments for monitoring the PMD in fiber 730 in accordance with the present invention include the Degree of Polarization, described in F. Roy, et al., "A Simple Dynamic Polarization Mode Dispersion Compensator," Technical Digest from the Optical Fiber Communications Conference 1999; Jones Matrix Eigenanalysis, described in B. L. Heffner, "Automated Measurement of Polarization Mode Dispersion Using Jones Matrix Eigenanalysis," Photonics Technology Letters, Vol. 4, No. 9, pp. 1066–1069 (1992); Muller Matrix Method, described in U.S. patent application Ser. No. 09/390,033, supra; and polarization-dependent signal delay method, described in R. M. Jopson, et al., "Vector Measurement of Polarization Mode Dispersion Using the Polarization-Dependent Signal Delay Method," LEOS' 99 Annual Meeting, Post deadline paper PD1.1, Nov. 8–11 (1999). The foregoing references are all hereby incorporated by reference as if fully set forth herein.

The foregoing merely illustrates the principles of the present invention. Those skilled in the art will be able to devise various modifications, which although not explicitly described or shown herein, embody the principles of the invention and are thus within its spirit and scope.

What is claimed is:

1. A compensated fiber transmission system, comprising:
   a fiber transmission system for carrying a light beam subject to PMD effects, said fiber transmission system being associated with a PMD vector at an output of said fiber transmission system;
   a compensator device for creating a frequency dependent compensating PMD vector, equal in magnitude and opposite in direction to said PMD vector of said fiber transmission system.

2. The system of claim 1 wherein said compensator device comprises:
   a first adjustable section of a birefringent element having a compensating input end and an opposing junction end, said first section having associated therewith a first PMD vector and a first rotation matrix; and
   a second adjustable section of a birefringent element having a junction end and an output end, said second section having associated therewith a second PMD vector and a second rotation matrix;
   said first and second adjustable sections being concatenated at said respective junction ends and having a third PMD vector at their junction;
   said compensator device having a first order compensating PMD vector at said compensating input end of said first section equal to the product of the transpose of said first rotation matrix and said third PMD vector; and
   said compensator device having a second order compensating PMD vector at said compensating input end of said first section equal to the product of the transpose of the derivative of said first rotation matrix with respect to frequency and said second PMD vector.

3. The system of claim 2 wherein said birefringent elements are polarization maintaining fibers.

4. The system of claim 2 wherein said birefringent elements are birefringent crystals.

5. The system of claim 2 wherein said birefringent elements are trombones.

6. The system of claim 1 further comprising:

a monitor for determining information relating to said compensating PMD vector.

7. The system of claims 6 wherein said monitor is designed for determining information relating to said compensating PMD vector at the output of said compensator device.

8. The system of claim 6 further comprising:

means for adjusting said compensator device; and communication means for communicating said information related to said compensating PMD vector of said fiber transmission system to said means for adjusting.

9. The system of claim 1 wherein said compensator device comprises:

a compensator device for creating a compensating PMD vector equal in magnitude to said PMD vector of said fiber transmission system, and having the same rate of change with respect to frequency as said PMD vector of said fiber transmission system; and a polarization pair controller for aligning the compensating PMD vector to be opposite in direction to said PMD vector of said fiber transmission system at one frequency and aligning the axis of rotation of the compensating PMD vector with the axis of rotation of the PMD vector of said fiber transmission system.

10. The system of claim 9 wherein said polarization pair controller comprises adjusting means for matching the sweep of said compensating PMD vector to the sweep of said PMD vector of said output light beam.

11. The system of claim 1 further comprising:

a monitor for determining information relating to said PMD vector of said fiber transmission system.

12. The system of claim 11 further comprising:

means for adjusting said compensator device; and communication means for communicating said information related to said PMD vector of said fiber transmission system to said means for adjusting.

13. A method for compensating for PMD effects, including higher order PMD, in a fiber transmission system, comprising the step of:

applying a frequency dependent compensating PMD vector at a point of output from said fiber transmission system, said compensating PMD vector being equal in magnitude and opposite in direction to a PMD vector of said fiber transmission system.

14. The method of claim 13 further comprising the step of monitoring a compensator device which is the source of said compensating PMD vector for information relating to said compensating PMD vector.

15. The method of claim 14 wherein said step of monitoring a compensator device is applied at the output of said compensator device.

16. The method of claim 14 further comprising the step of using said information relating to said compensating PMD vector from said monitoring step to adaptively control said compensating PMD vector.

17. The method according to claim 13 wherein said higher order PMD is second order PMD and wherein said applying step further comprises the steps of:

applying a frequency dependent compensating PMD vector at a point of output from said fiber transmission system, said compensating PMD vector being equal in magnitude to and having a frequency sweep matching, a PMD vector of said fiber transmission system;

aligning said compensating PMD vector to be opposite in direction to said PMD vector of said fiber transmission system at one frequency; and aligning the axis of rotation of said compensating PMD vector with the axis of rotation of said PMD vector of said fiber transmission system at said one frequency.

18. The method of claim 17 wherein said frequency sweep of said compensating PMD vector is a planar sweep.

19. The method of claim 13 further comprising the steps of:

monitoring the fiber transmission system for information relating to said PMD vector of said fiber transmission system; and determining from said monitoring step the rate of change of said PMD vector of said fiber transmission system, due to change in frequency.

* * * * *